United States Patent [19]

Triffaux

[11] Patent Number: 5,085,141
[45] Date of Patent: Feb. 4, 1992

[54] DEVICE FOR THE DRIVE OF DRIVING ROLLERS OF A CALENDER FOR LAMINATED GLAZINGS AND CALENDER EQUIPPED WITH THIS DEVICE

[75] Inventor: Francis M. Triffaux, Thourotte, France

[73] Assignee: Saint-Gobain Vitrage International, Courbevoie, France

[21] Appl. No.: 436,348

[22] Filed: Nov. 14, 1989

[30] Foreign Application Priority Data

Nov. 14, 1988 [FR] France .................. 88 14742

[51] Int. Cl.⁵ .................. B30B 3/04; B32B 17/06; B32B 31/20
[52] U.S. Cl. .................. 100/155 G; 100/172; 156/582
[58] Field of Search ............. 100/155 G, 168, 169, 100/170, 172; 72/178–181, 249; 156/555, 582; 226/181, 188

[56] References Cited

U.S. PATENT DOCUMENTS

| | | | |
|---|---|---|---|
| 760,667 | 5/1904 | Walsh | 65/256 |
| 1,273,388 | 7/1918 | Loyer et al. | 156/582 X |
| 1,608,657 | 11/1926 | Howard | 65/257 |
| 2,068,104 | 1/1939 | Haux | 100/210 |
| 2,248,088 | 7/1941 | Kane | 72/179 X |
| 2,277,631 | 3/1942 | Bullock | 269/71 |
| 2,291,627 | 8/1942 | Huck | 226/188 X |
| 2,340,933 | 2/1944 | Chilton | 100/155 G |
| 2,525,980 | 10/1950 | Walters | 100/155 G X |
| 3,051,214 | 8/1962 | Rutten | 72/181 X |
| 3,669,808 | 6/1972 | Klotzbach et al. | 100/155 G X |
| 3,901,060 | 8/1975 | Corradini | 72/179 |
| 4,327,634 | 5/1982 | Colmon et al. | 156/582 |
| 4,627,886 | 12/1986 | Grone et al. | 156/526 |
| 4,679,291 | 7/1987 | Schmeal et al. | 156/249 |
| 4,696,713 | 9/1987 | Okafuji et al. | 100/155 G X |
| 4,701,240 | 10/1987 | Kraemer et al. | 100/155 G X |
| 4,788,911 | 12/1988 | Bishop et al. | 100/155 G |
| 4,832,785 | 5/1989 | Cappa et al. | 156/526 |
| 4,988,398 | 1/1991 | Pereman et al. | 100/155 G X |

FOREIGN PATENT DOCUMENTS

| | | | |
|---|---|---|---|
| 0215388 | 3/1958 | Australia | 156/106 |
| 842587 | 6/1952 | Fed. Rep. of Germany | 100/172 |
| 62-244528 | 10/1987 | Japan | 72/178 |
| 63-149020 | 6/1988 | Japan | 72/178 |
| 1433540 | 10/1988 | U.S.S.R. | 72/181 |
| 936328 | 9/1963 | United Kingdom | 72/249 |

Primary Examiner—Harvey C. Hornsby
Assistant Examiner—Stephen F. Gerrity
Attorney, Agent, or Firm—Oblon, Spivak, McClelland, Maier & Neustadt

[57] ABSTRACT

A device for the drive of driving rollers of a calendar for the pressing of laminated glazings 49 has at least one series of pressing rollers 1, 2 mounted on a mobile frame 3, at least one of these pressing rollers being driven by a driving motor 9 to which it is connected by a transmission system. Stationary and nondeformable drive shaft 11 is mounted on a mobile frame 3 and connected to driving motor 9 by a chain 10 or belt and to each driven roller 6 by the transmission system including a bevel gear 14 and a deformable, jointed unit 16 extending in an essentially vertical direction. The calendar equipped with this device can be used for the assembly of glazings of complex shapes.

9 Claims, 7 Drawing Sheets

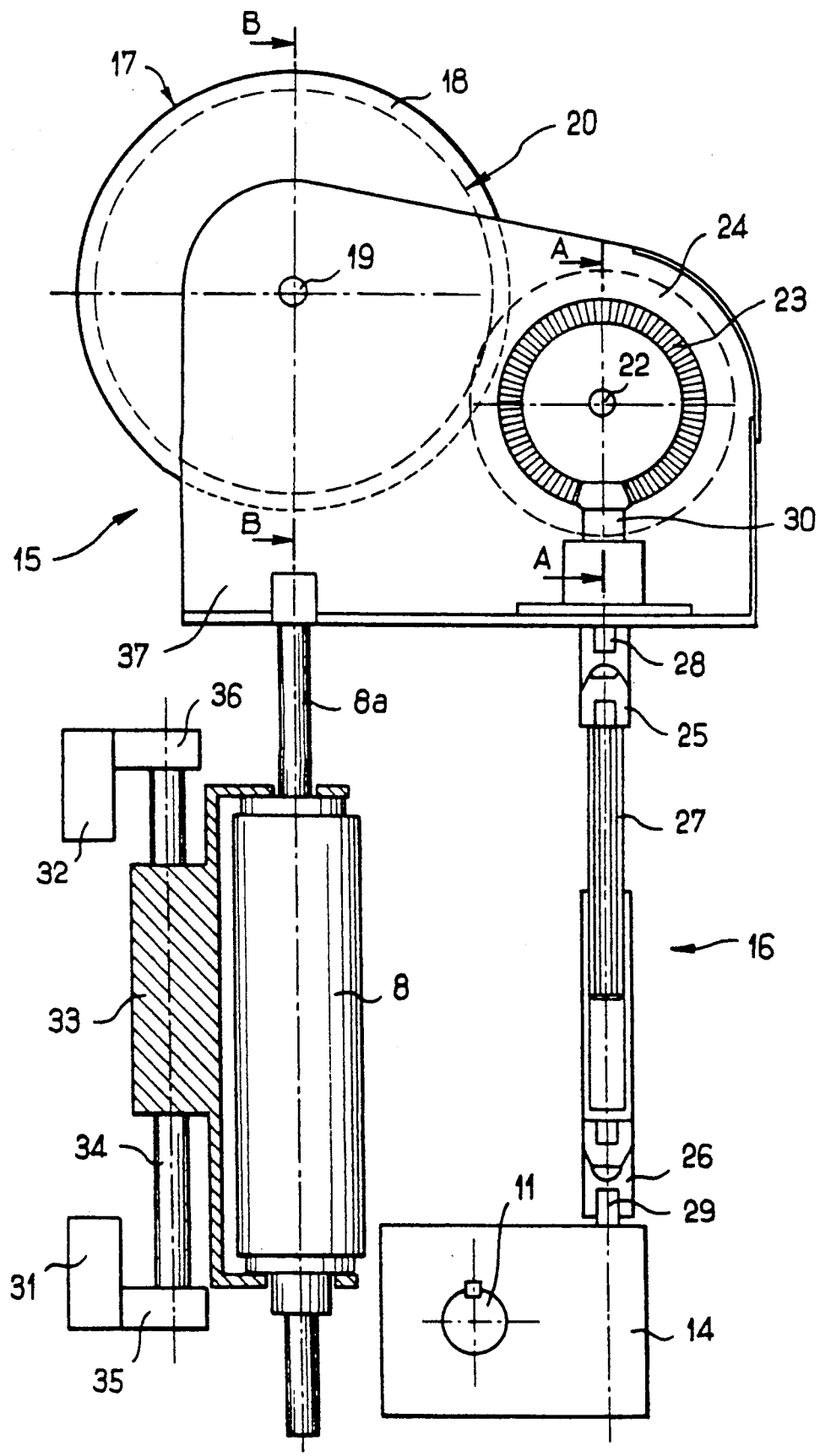
FIG_3

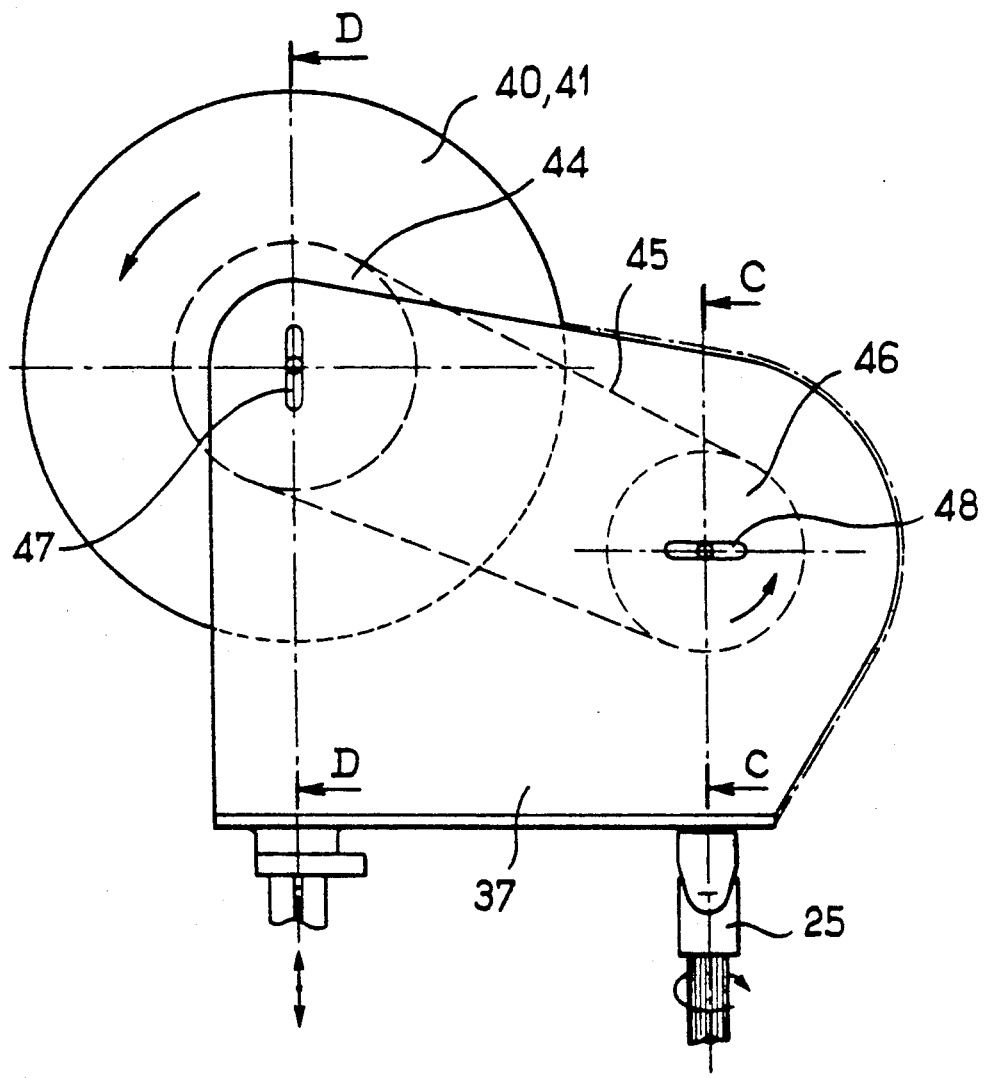
FIG_6

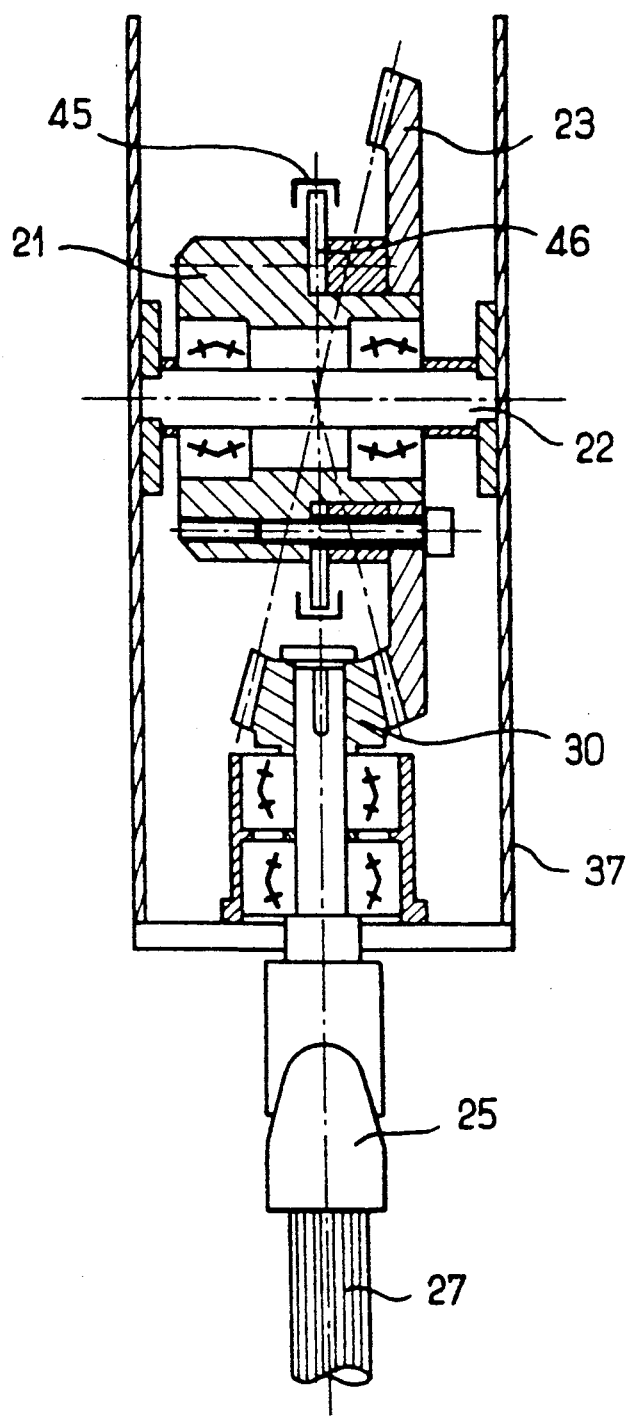
FIG_7

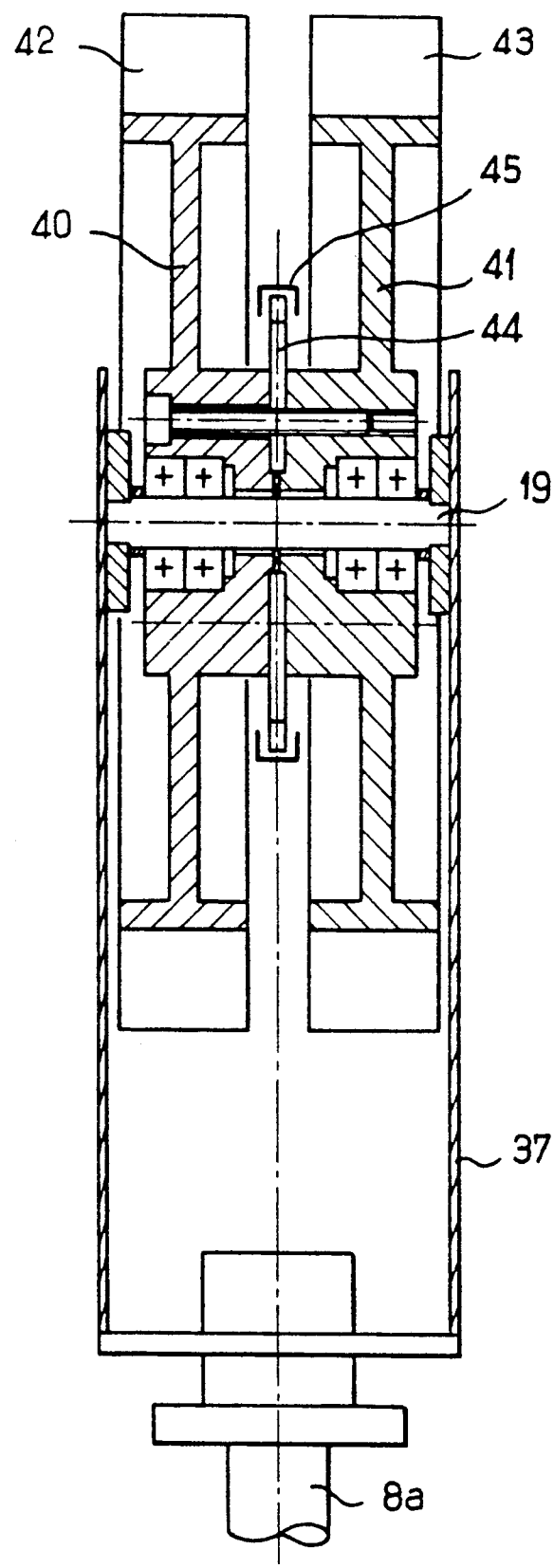
FIG_8

DEVICE FOR THE DRIVE OF DRIVING ROLLERS OF A CALENDER FOR LAMINATED GLAZINGS AND CALENDER EQUIPPED WITH THIS DEVICE

BACKGROUND OF THE INVENTION

1. Field of the Invention

This invention relates to the production of laminated glazings and particularly the assembly of stacked constituent elements of a laminated glazing by calendering, i.e. by passage of said stacked elements between two series of pressing rollers, as well as the calender equipped with such rollers.

2. Related Art

The calenders known for this type of assembly generally are equipped with two series of rollers: (1) a series of lower rollers placed beside one another, their positions being adjustable independently of one another so as to obtain a precurve corresponding to the desired crosswise curve which generally is the average curve of the glazing, and (2) a series of upper rollers placed approximately in the same way. The two series of rollers also generally are mounted on a mobile frame able to pivot around a horizontal pin, so that the rollers remain perpendicular to the glazing during the entire assembly operation.

The mounting of rollers on the frame is carried out according to the type of calenders used, e.g., they may be fixed directly on the frame or mounted thereon via a cylinder.

The drive of the glazing during the calendering operation is provided by driving rollers which generally comprise one or more of the lower rollers. The drive of the driving rollers is provided by a driving unit including a geared motor mounted at the end of the pivot pin of the mobile frame. The drive from the motor is transmitted by a chain, either to a shaft extending over the entire width of the mobile frame and mounted on this frame in stationary position, or to a unit of splined shafts and universal joints which enable it to adapt to variations in height and inclination existing between the different driving rollers. From the shaft or the shaft unit, the movement is transmitted by other chains to the driving rollers.

When the driving rollers are mounted directly on the pivoted frame, variations in height and inclination between the various driving rollers stem only from the precurve given to the units of pressing rollers. When the driving rollers are mounted via pneumatic cylinders on the pivoted frame, the drive shaft consisting of a unit of shafts should also follow the movements in height transmitted by the driving rollers, due to their mounting on cylinders, as the glazing passes in the calender.

This system operates well when the glazings are slightly curved. But for the glazings with more accentuated and/or more complex curves, for example for glazings of complex shape, this system brings about rigidities and variations of rotation rate of the driving rollers relative to one another because the unit of drive shafts resists variations in height which are imposed and because the universal joints gradually are brought to work at the limits of their angular travel.

This system exhibits another drawback. The necessity of inserting a universal joint in the unit of drive shafts on both sides of a driving roller does not allow two driving rollers to be brought together side by side. Considering the near necessity of inserting in addition a splined shaft element, it therefore is necessary, in order to have a substantially continuous pressing bed, to insert at a minimum two idle rollers between each two driving rollers, which is contradictory to the criteria imposed for a good operation of the calender which requires that a driving roller should always be positioned at the tip of the glazing to make possible its entry in the calender.

This arrangement is not very awkward then assembling slightly curved glazings of approximately trapezoidal shape, whose front tip almost always presents itself at the same location of the series of rollers. On the other hand, in the case of glazings which are more curved and of greater dimensions, it is necessary to increase the number of driving rollers and it is useful to place several of them side by side over at least one part of the series of pressing rollers.

SUMMARY OF THE INVENTION

The invention has as an object a new drive device of driving rollers, which prevents the above drawbacks.

The drive device of the driving rollers according to the invention comprises a stationary and nondeformable drive shaft, mounted on the mobile frame of the calender, connected to a driving means by a chain or belt, and to each driving roller by a transmission system comprising a bevel gear and a jointed unit having a variable length in an essentially vertical direction.

The device according to the invention, by placing the variable length part of the transmission system approximately vertically, has the advantage of reducing the rigidity induced in the system since the stresses essentially are vertical. It also increases the possibility of vertical travel.

The transmission system connecting the shaft to a driving roller exhibits a reduced lateral space requirement, which makes possible an easy assembly of several of these systems side by side.

According to an embodiment of the invention, the deformable, jointed unit is formed by an approximately vertical shaft comprising two universal joints and a splined shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows, in side view, the assembly of a driving roller and its drive device;

FIG. 6 shows, in side view, a variant of the assembly of a driving roller;

FIG. 7 is a view in section along DD of the device shown in FIG. 6; and

FIG. 8 is a view in section along EE of the device shown in FIG. 6.

DETAILED DESCRIPTION OF THE PREFERRED EMBODIMENTS

Figures 1, 2:
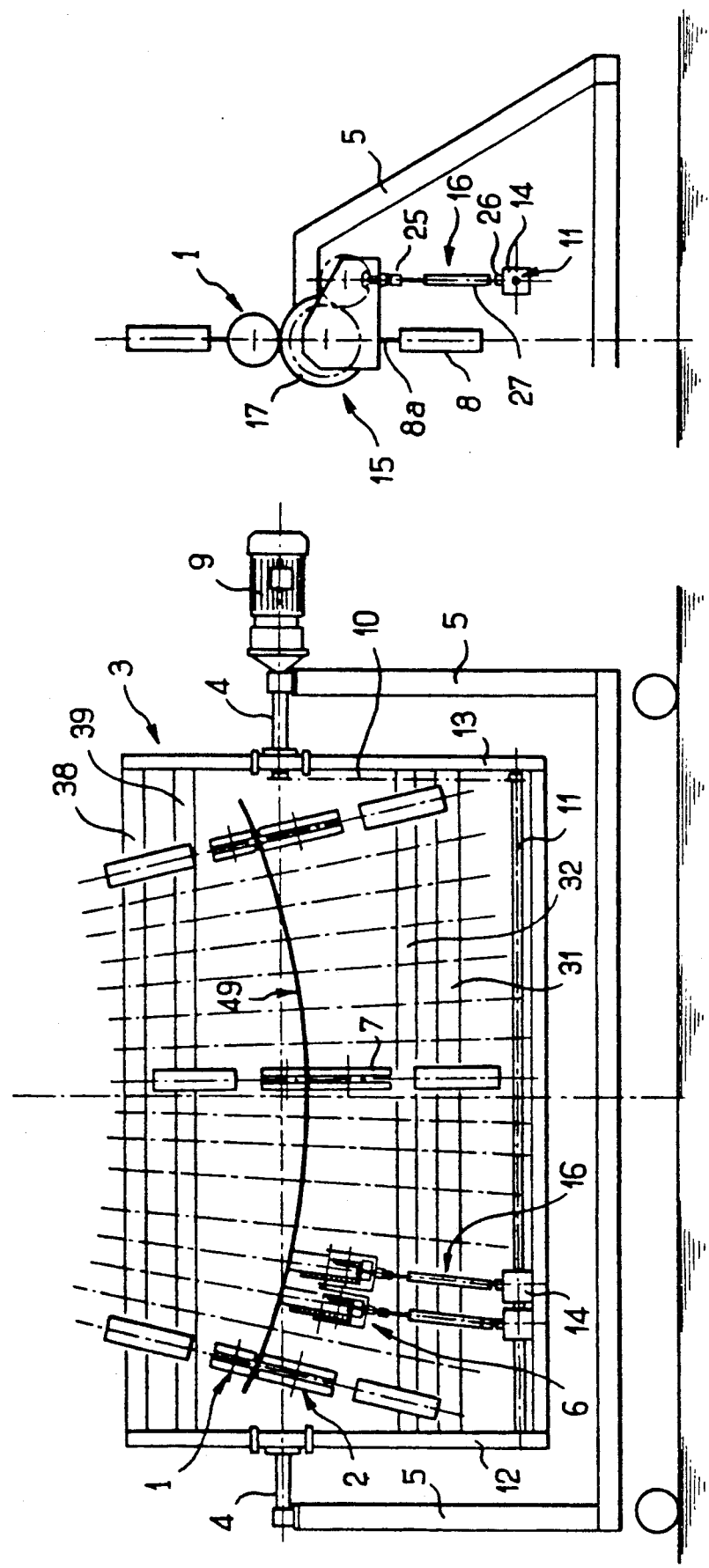
FIG. 1 shows, in front view, a calender equipped with the drive device according to the invention.
FIG. 2 shows, in side view, the calender of FIG. 1.

FIGS. 1 and 2 show, in front and side view, a floating calender equipped with a drive device according to the invention. A floating calender is understood to be a calender equipped with pressing rollers mounted on pneumatic or hydraulic cylinders.

The device according to the invention is particularly useful for this type of calender which makes possible a greater variation of height for the pressing rollers. It is, of course, applicable to other calender types.

The calender comprises a unit of upper pressing rollers 1 and a unit of lower pressing rollers 2, both mounted in a mobile frame 3 able to pivot around a pin 4 carried by a frame 5.

The unit of lower pressing rollers 2 comprises driving rollers 6 and also of idle rollers 7 consisting of a pair of two rollers. Each roller 6 or 7 is mounted at the end of a rod 8a of a pneumatic cylinder 8, each lower roller being placed opposite an upper roller. In FIG. 1, cylinders 8 acting on the driving rollers are not shown.

The drive for the driving rollers 6 of both the upper and lower pressing rollers 1 and 2 is controlled by a geared motor unit 9 mounted at the end of pivot pin 4. Although the drive for the lower pressing rollers 2 will be described, a corresponding drive may also be provided for the upper pressing rollers 1. The geared motor unit drives, by chain 10, a shaft 11 which is horizontal and rigid, and which is supported for rotation about a fixed axis on two vertical struts 12 and 13 of mobile frame 3.

Bevel gears 14, through which shaft 11 passes, transmit the movement of shaft 11 to a driving roller unit 15 of each driving roller 6, by the rotation of a jointed transmission system 16. The position of each of the bevel gears 14 is adjustable along shaft 11.

FIG. 3 shows in more detail, in side view, the assembly of driving roller unit 15, carried by a fluid cylinder 8 and connected by its transmission system 16 and bevel gear 14, to shaft 11.

Figure 5:
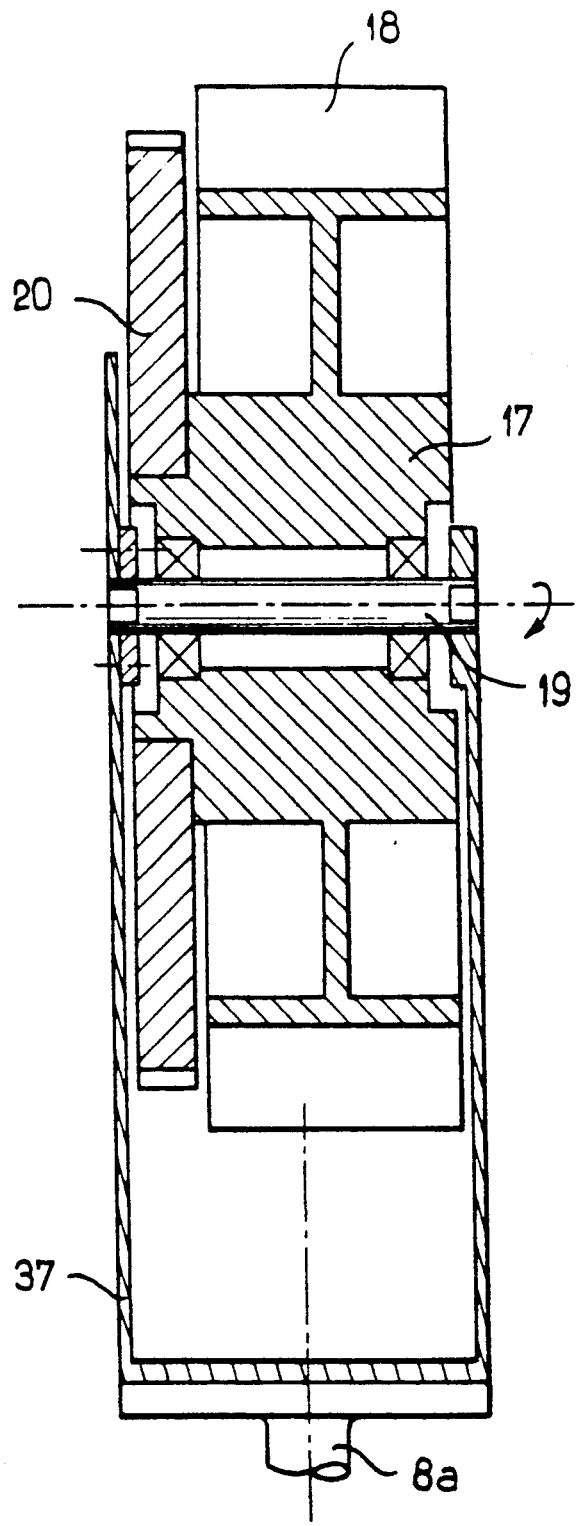
FIG. 5 is a view in section along BB of the device shown in FIG. 3.

The driving roller unit 15 here includes a roller element 17 coated with a rubber layer 18. The roller element 17 is mounted on roller bearings for rotation around pin 19. A gear 20 is mounted for a rotation with roller element 17, as shown in FIG. 5 which is a section of driving roller unit 15 in a vertical plane including pin 19.

Figure 4:
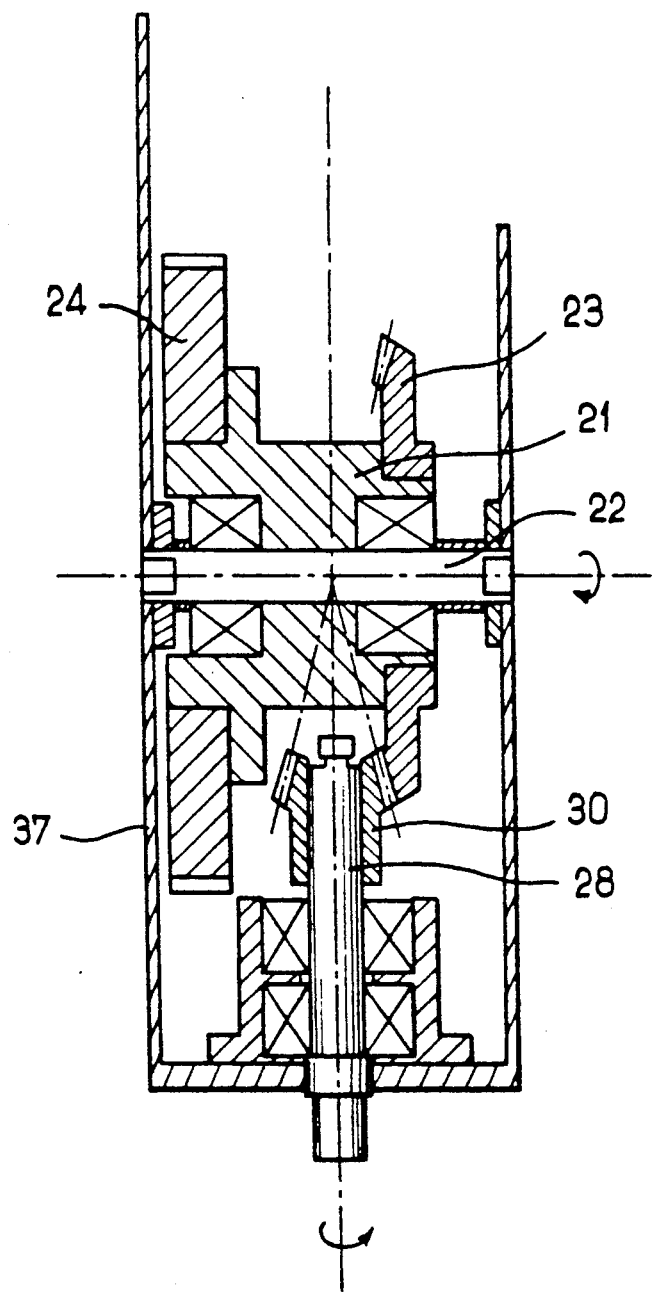
FIG. 4 is a view in section along AA of the device shown in FIG. 3.

The transmission system 16 comprises (FIG. 4) in its upper part a hub 21 mounted on roller bearings for rotation around a pin 22, this hub 21 carrying a gear 24 and another bevel gear 23. Under this upper unit, the transmission system 16 comprises a variable length, jointed unit including two universal joints 25 and 26 mounted at the two ends of a splined shaft and sleeve assembly 27. Universal joint 25 is connected to a shaft 28 at the end of which is mounted a bevel pinion 30 meshing with wheel 23. Universal joint 26 is connected to output shaft 29 of bevel gear 14 and extends at 90° from shaft 11.

Gear 24 meshes with gear 20, so that pinion 30 and gear wheels 23, 24 and 20 constitute a system of gears which, in association with the jointed unit consisting of universal joints and the splined shaft and sleeve assembly 27 transmits the rotation movement of the output shaft of bevel gear 14 to roller element 17.

As shown in FIG. 3, driving roller unit 15 is also mounted at the end of rod 8a of cylinder 8. The entire driving roller unit is carried by a yoke 37 integral with the end of the rod 8b, this yoke carrying the two pins 19 and 22. Cylinder 8 is mounted so as to be adjustable in height and inclination on beams 31 and 32. Cylinder 8 is held by a plate 33 slidably carried by a column 34. The position in height of cylinder 8 is determined by locking the plate 33 on the column 34 at the desired height. Column 34 itself is held by two lugs 35 and 36 attached to beams 31 and 32 of mobile frame 3, so as to obtain the desired inclination in the pressing plane. Any driving roller unit for the upper rollers is mounted via the beams 38 and 39.

The device operates as follows:

The precurve of pressing units 1 and 2 is first determined by pivoting the frame 3, and so adjusting the inclination of all columns 34 and by adjusting the height of all cylinders 8 on their column 34 for the cylinders of the lower pressing unit and on the column for the cylinders of the upper pressing unit.

The position of all bevel gears 14 then is adjusted along shaft 11, so that the inclination of splined shaft and sleeve assembly 27 relative to corresponding cylinder 8 is minimal. Thus, universal joints 25 and 26 always will work under optimal conditions. In addition, thanks to this device, the rotation axes of shafts 28 and 29 always are nearly parallel, whatever the inclination given to driving roller 6. Driving roller elements 17 therefore always will be driven at the same rate of rotation.

As glazing 49 passes through the calender, because of variations of its crosswise curve, the height of the pairs of upper and lower pressing rollers 1 and 2, mounted in opposition, varies. This is reflected by the movements of the piston 8a of cylinders 8 and, in the case of the driving rollers, by equivalent movements of the splined shaft of assembly 27. The movement of these splined shafts is performed in the same plane as the principal stress which moves the pressing rollers. The resistance to this movement is thus minimal.

In addition, the lateral space requirement of the driving roller units 15 is very small, which makes it possible to place them side by side when necessary.

FIGS. 6, 7 and 8 show an assembly variant of a driving roller unit.

In this variant, each driving roller element consists of a pair of roller elements 40 and 41 and is driven by a central chain 45.

Driving roller unit 15 (FIG. 8) comprises two roller elements 40 and 41 coated with a rubber layer 42 and 43 and a chain sprocket 44 located between the two rollers elements.

Roller 40, sprocket 44 and roller element 41 are mounted integrally against one another and on the roller bearings for rotation around pin 19.

Sprocket 44 is connected by chain 45 to a second sprocket 46 bolted to hub 21 mounted on the roller bearings for rotation around pin 22. The two sprockets 44 and 46 are located in the same plane.

The other transmission elements: bevel gear 23, bevel pinion 30, universal joint 25 and splined shaft and sleeve assembly 27 are identical with those described in the embodiment shown in FIG. 3. Likewise, the assembly is carried by yoke 37 integral with the end of the rod of the cylinder and carrying the pins 19 and 22. The distance between pins 19 and 22 can be adjusted by moving from pin 19 along slot 47 and/or moving pin 22 along slot 48, so as to give chain 45 a suitable tension.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A calender for pressing curved laminated glazings, comprising:

a mobile frame;

pressing means mounted to said frame for pressing the curved laminated glazings, said pressing means including at least one series of pressing rollers mounted for vertical movement to follow the curvature of the laminated glazings, said at least one series of pressing rollers including at least one driven roller;

roller driving means including a rigid horizontal drive shaft mounted for rotation in said frame and connected to a driving motor for driving the drive shaft; and transmission means for transmitting a rotation of said drive shaft to each said at least one driven roller, comprising at least one bevel gear unit slidably mounted to said drive shaft and a vertically extending, variable length jointed unit connected between each said at least one bevel gear unit and a corresponding said at least one driven roller.

2. The calender of claim 1 wherein each said at least one driven roller comprises:

a yoke mounted to said frame; and a roller element rotatably mounted to said yoke and driven via said transmission means, and wherein one of said universal joints is supported by said yoke.

3. The calender of claim 2 including a fluid cylinder connected between said frame and said yoke, whereby said at least one driven roller is mounted to said frame via said cylinder.

4. The calender of claim 2 including gear means connected between said transmission means and said roller element for driving said roller element.

5. The calender of claim 2 including chain and sprocket means connected between said transmission means and said roller element for driving said roller element.

6. The calender of claim 5 wherein said roller element comprises dual roller elements and a chain sprocket positioned between said dual roller elements.

7. The calender of claim 1 wherein said at least one series of pressing rollers comprises upper and lower rollers.

8. The calender of claim 1 wherein said calender is a floating calender.

9. A calendar for pressing curved laminated glazings, comprising:

a mobile frame;

pressing means mounted to said frame for pressing the curved laminated glazings, said pressing means including at least one series of pressing rollers mounted for vertical movement to follow the curvature of the laminated glazings, said at least one series of pressing rollers including at least one driven roller;

roller driving means including a rigid horizontal drive shaft mounted for rotation in said frame and connected to a driving motor for driving the drive shaft; and transmission means for transmitting a rotation of said drive shaft to each said at least one driven roller, comprising at least one bevel gear unit mounted to said drive shaft and a vertically extending, variable length jointed unit connected between each said at least one bevel gear unit and a corresponding said at least one driven roller, wherein said jointed unit comprises a splined shaft and sleeve assembly, and universal joints at opposite ends of said splined shaft and sleeve assembly for connecting said splined shaft and sleeve assembly to said bevel gear and to said driven roller.

* * * * *